(12) United States Patent
Taniguchi et al.

(10) Patent No.: US 11,887,785 B2
(45) Date of Patent: Jan. 30, 2024

(54) MULTILAYER CERAMIC CAPACITOR AND CERAMIC MATERIAL POWDER

(71) Applicant: TAIYO YUDEN CO., LTD., Tokyo (JP)

(72) Inventors: Katsuya Taniguchi, Takasaki (JP); Tsuyoshi Sogabe, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 224 days.

(21) Appl. No.: 17/179,180

(22) Filed: Feb. 18, 2021

(65) Prior Publication Data

US 2021/0183571 A1   Jun. 17, 2021

Related U.S. Application Data

(63) Continuation of application No. 16/286,356, filed on Feb. 26, 2019, now Pat. No. 10,957,485.

(30) Foreign Application Priority Data

Mar. 6, 2018   (JP) .................................. 2018-039972
Nov. 26, 2018  (JP) .................................. 2018-220281

(51) Int. Cl.
*H01G 4/30* (2006.01)
*H01G 4/12* (2006.01)
(Continued)

(52) U.S. Cl.
CPC .......... *H01G 4/1209* (2013.01); *H01G 4/012* (2013.01); *H01G 4/228* (2013.01); *H01G 4/30* (2013.01)

(58) Field of Classification Search
CPC .... C04B 2235/5445; C04B 2235/3262; C04B 2235/3206; C04B 2235/79;
(Continued)

(56) References Cited

U.S. PATENT DOCUMENTS 6,051,516 A   4/2000   Mizuno et al.
6,072,688 A   6/2000   Hennings et al.
(Continued)

FOREIGN PATENT DOCUMENTS

CN   103964840 A   8/2014
CN   106505144 A   3/2017
(Continued)

OTHER PUBLICATIONS

A First Office Action issued by the State Intellectual Property Office of China dated Jul. 2, 2021, for Chinese counterpart application No. 201910167134.5 (17 pages).
(Continued)

*Primary Examiner* — Noah S Wiese
(74) *Attorney, Agent, or Firm* — Law Office of Katsuhiro Arai

(57) ABSTRACT

A multilayer ceramic capacitor includes: a multilayer structure in which dielectric layers and internal electrode layers are alternately stacked; wherein a main component of the dielectric layers is a ceramic material having a main phase having a perovskite structure ($ABO_3$) wherein a B site includes an element solid-solved in the B site and acting as a donor; wherein an A site and the B site of the ceramic material includes a rare earth element, wherein (an amount of the rare earth element substitutionally solid-solved in the A site)/(an amount of the rare earth element substitutionally solid-solved in the B site) is 0.75 or more and 1.25 or less. The amount of the element acting as the donor in the B site is 0.05 to 0.3 atm % relative to a main component element of the B site.

2 Claims, 2 Drawing Sheets

(51) Int. Cl.
*H01G 4/228* (2006.01)
*H01G 4/012* (2006.01)

(58) Field of Classification Search
CPC .... C04B 2235/3256; C04B 2235/3229; C04B 2235/3227; C04B 2235/3225; C04B 2235/3224; C04B 35/4682; H01G 4/1209; H01G 4/012; H01G 4/228; H01G 4/30; H01G 4/1227; H01G 4/1245
See application file for complete search history.

(56) References Cited

U.S. PATENT DOCUMENTS

| | | | |
|---|---|---|---|
| 6,078,494 A * | 6/2000 | Hansen | H01G 4/1227 361/321.5 |
| 7,993,611 B2 | 8/2011 | Weir et al. | |
| 8,638,544 B2 | 1/2014 | Yoon et al. | |
| 10,607,776 B2 | 3/2020 | Park et al. | |
| 10,957,485 B2 | 3/2021 | Taniguchi et al. | |
| 11,056,280 B2 | 7/2021 | Ariizumi et al. | |
| 2005/0219794 A1 | 10/2005 | Iguchi et al. | |
| 2006/0251927 A1 | 11/2006 | Umeda et al. | |
| 2007/0109720 A1 | 5/2007 | Kamei | |
| 2009/0128988 A1 | 5/2009 | Sohn et al. | |
| 2010/0142120 A1 | 6/2010 | Azuma et al. | |
| 2010/0285316 A1 | 11/2010 | Weir et al. | |
| 2011/0152060 A1 | 6/2011 | Weir et al. | |
| 2011/0212382 A1 | 9/2011 | Randall et al. | |
| 2012/0033343 A1 | 2/2012 | Yoon et al. | |
| 2014/0240896 A1 | 8/2014 | Morigasaki et al. | |
| 2016/0217924 A1 | 7/2016 | Morita et al. | |
| 2016/0307701 A1 | 10/2016 | Park et al. | |
| 2017/0025222 A1 | 1/2017 | Park et al. | |
| 2017/0032894 A1 | 2/2017 | Kawamura et al. | |
| 2017/0186537 A1 | 6/2017 | Park et al. | |
| 2017/0372841 A1 | 12/2017 | Kawamura et al. | |
| 2019/0189345 A1 | 6/2019 | Moon et al. | |
| 2019/0241476 A1 | 8/2019 | Nomura et al. | |
| 2020/0258685 A1 | 8/2020 | Ham et al. | |
| 2020/0402719 A1 | 12/2020 | Sugawara | |

FOREIGN PATENT DOCUMENTS

| | | |
|---|---|---|
| JP | H11154620 A | 6/1999 |
| JP | 2010034274 A | 2/2010 |
| JP | 2013157459 A | 8/2013 |
| JP | 2013211398 A | 10/2013 |
| JP | 2016139720 A | 8/2016 |
| JP | 6635126 B2 | 1/2020 |
| NL | 1015886 C2 | 2/2002 |
| TW | 200423165 A | 11/2004 |
| WO | 2008050863 A1 | 5/2008 |

OTHER PUBLICATIONS

Final Office Action issued by U.S. Patent and Trademark Office, dated Jan. 23, 2023, for a co-pending U.S. Appl. No. 16/900,587. (23 pages).
A Notice of Reasons for Refusal issued by the Japanese Patent Office, dated Oct. 4, 2022, for Japanese counterpart application No. 2018-220281. (2 pages).
Non-Final Office Action issued by U.S. Patent and Trademark Office, dated Jan. 28, 2022, for a co-pending U.S. Appl. No. 16/900,587. (14 pages).
Non-Final Office Action issued by U.S. Patent and Trademark Office, dated Jul. 13, 2022, for a co-pending U.S. Appl. No. 16/900,587. (13 pages).
Final Office Action issued by U.S. Patent and Trademark Office, dated Sep. 17, 2020, for U.S. Appl. No. 16/286,356 (6 pages).
Non-Final Office Action issued by U.S. Patent and Trademark Office, dated Apr. 3, 2020, for U.S. Appl. No. 16/286,356 (12 pages).
Notice of Allowance issued by U.S. Patent and Trademark Office, dated Dec. 30, 2020, for U.S. Appl. No. 16/286,356 (8 pages).
Notice of Reasons for Refusal issued by the Japanese Patent Office, dated Feb. 14, 2023, for Japanese unterpart application No. 2018-220281. (3 pages)
An Office Action issued by Taiwan Intellectual Property Office, dated Mar. 30, 2022, for Taiwan counterpart application No. 108107409. (7 pages).
Non-Final Office Action issued by U.S. Patent and Trademark Office, dated May 22, 2023, for a co-pending U.S. Appl. No. 16/900,587. (25 pages).
Final Office Action issued by U.S. Patent and Trademark Office, dated Sep. 15, 2023, for a co-pending U.S. Appl. No. 16/900,587. (23 pages).
A Request for the Submission of an Opinion issued by Korean intellectual Property Office dated Nov. 13, 2023, for Korean counterpart application No. 10-2019-0021775 (6 pages).
A Notice of Reasons for Refusal issued by the Japanese Patent Office, dated Nov. 28, 2023, for Japanese related application No. 2020-070840. (5 pages).

* cited by examiner

MULTILAYER CERAMIC CAPACITOR AND CERAMIC MATERIAL POWDER

CROSS-REFERENCE TO RELATED APPLICATION

This application is a continuation of U.S. patent application Ser. No. 16/286,356, filed Feb. 26, 2019, which is based upon and claims the benefit of priority of Japanese Patent Applications No. 2018-039972, filed on Mar. 6, 2018 and No. 2018-220281, filed on Nov. 26, 2018, each disclosure of which is herein incorporated herein by reference in its entirety. The applicant herein explicitly rescinds and retracts any prior disclaimers or disavowals or any amendment/statement otherwise limiting claim scope made in any parent, child or related prosecution history with regard to any subject matter supported by the present application.

FIELD

A certain aspect of the present invention relates to a multilayer ceramic capacitor and ceramic material powder.

BACKGROUND

A dielectric material achieving sufficient reliability characteristic is required in a multilayer ceramic capacitor having dielectric layers of which a thickness is small. For example, it is effective that a specific element is solid-solved in material powder in advance. Japanese Patent Application Publication No. 2016-139720 discloses a technology in which a donor element is added for the purpose of improving lifetime characteristic.

SUMMARY OF THE INVENTION

However, recently, the thickness of the dielectric layers is reduced, and the number of the stacked dielectric layers increases. And, further improvement of the lifetime characteristic is required. And, improvement of insulation characteristic is required. It is therefore difficult to achieve further high reliability, only with a method for reducing an amount of oxygen defect by the donor element.

The present invention has a purpose of providing a multilayer ceramic capacitor and ceramic material powder that are capable of achieving high reliability.

According to an aspect of the present invention, there is provided a multilayer ceramic capacitor including: a multilayer structure in which each of a plurality of dielectric layers and each of internal electrode layers are alternately stacked; wherein a main component of the dielectric layers is a ceramic material, wherein a main phase of the ceramic material has a perovskite structure expressed by a general formula $ABO_3$, wherein a B site of the ceramic material includes an element acting as a donor; wherein an A site and the B site of the ceramic material includes a rare earth element, wherein (an amount of the rare earth element substitutionally solid-solved in the A site)/(an amount of the rare earth element substitutionally solid-solved in the B site) is 0.75 or more and 1.25 or less.

According to another aspect of the present invention, there is provided ceramic material powder including: a main phase having a perovskite structure expressed by a general formula $ABO_3$; an element acting as a donor, in a B site of the perovskite structure; and a rare earth element in an A site and the B site of the perovskite structure, wherein (an amount of the rare earth element substitutionally solid-solved in the A site)/(an amount of the rare earth element substitutionally solid-solved in the B site) is 0.75 or more and 1.25 or less.

DETAILED DESCRIPTION

A description will be given of an embodiment with reference to the accompanying drawings.

Embodiment

Figure 1:
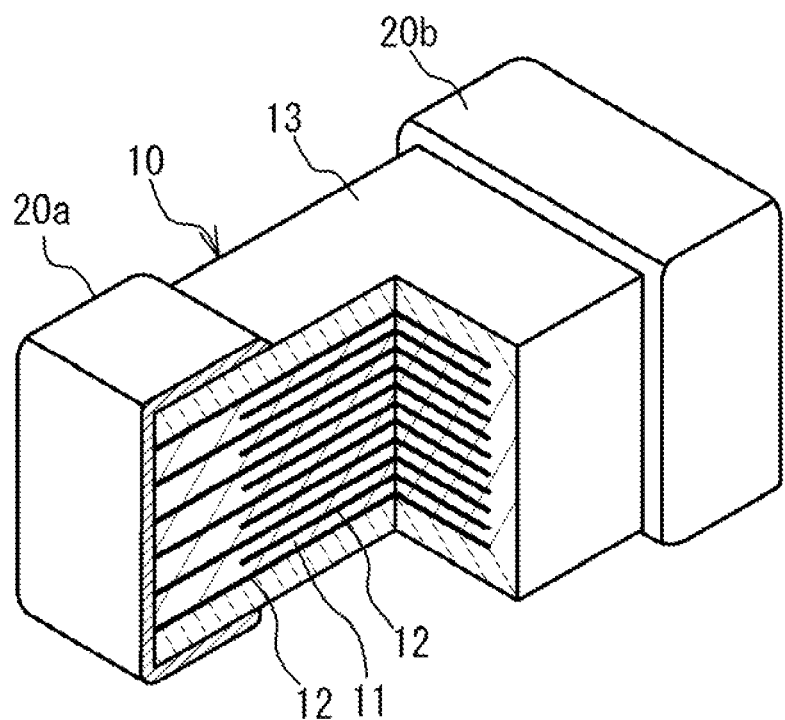
FIG. 1 illustrates a partial perspective view of a multilayer ceramic capacitor.

FIG. 1 illustrates a partial perspective view of a multilayer ceramic capacitor 100 in accordance with an embodiment. As illustrated in FIG. 1, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. In four faces other than the two edge faces of the multilayer chip 10, two faces other than an upper face and a lower face of the multilayer chip 10 in a stacking direction are referred to as side faces. The external electrodes 20a and 20b extend to the upper face, the lower face and the two side faces. However, the external electrodes 20a and 20b are spaced from each other.

The multilayer chip 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in the stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof.

The dielectric layers 11 are mainly composed of a ceramic material of which a main phase is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-4}Ca_xSr_yTi_{1-z}Zr_zO_3$ ($0 \leq x \leq 1$, $0 \leq y \leq 1$, $0 \leq z \leq 1$) having a perovskite structure.

For the purpose of downsizing the multilayer ceramic capacitor 100 and enlarging a capacity of the multilayer ceramic capacitor 100, reduction of a thickness of the dielectric layers 11 is required. However, when the thickness of the dielectric layers 11 is reduced, lifetime characteristic may be degraded because of insulation breakdown. And the reliability may be degraded.

A description will be given of degradation of reliability. A main component of the dielectric layer 11 is a ceramic material using ceramic material powder of which a main phase has a perovskite structure expressed by a general chemical formula $ABO_3$. During firing, the ceramic material powder is exposed to reductive atmosphere. Therefore, an oxygen defect may occur in $ABO_3$. When the multilayer ceramic capacitor 100 is used, a voltage is repeatedly applied to the dielectric layers 11. In this case, the oxygen defect moves in the dielectric layers 11. Thus, barrier is broken. That is, the oxygen defect in the perovskite structure causes the degradation of the reliability of the dielectric layer 11.

And so, a B site of the perovskite structure includes an element acting as a donor. That is, the element acting as the donor is substitutionally solid-solved in the B site. For example, the element acting as the donor is such as Mo (molybdenum), Nb (niobium), Ta (tantalum), W (tungsten) or the like. When the element acting as the donor is substitutionally solid-solved in the B site, the oxygen defect in the perovskite structure is suppressed. It is therefore possible to elongate the life of the dielectric layer 11 and improve the reliability.

In the B site, when an amount of the element acting as the donor is excessively small, it may not be necessarily possible to sufficiently suppress oxygen defect. And so, it is preferable that an amount of the element that acts as the donor and is substitutionally solid-solved in the B site has a lower limit. For example, it is preferable that the amount of the element that acts as the donor and is substitutionally solid-solved in the B site is 0.05 at% or more on a presumption that an amount of a main component element of the B site is 100 at%. It is more preferable that the amount is 0.1 at% or more.

On the other hand, when the amount of the element acting as the donor is excessively large in the B site, defect such as decrease of insulation resistance of the multilayer ceramic capacitor 100 may occur. And so, it is preferable that the amount of the element that acts as the donor and is substitutionally solid-solved in the B site has an upper limit. For example, it is preferable that the amount of the element that acts as the donor and is substitutionally solid-solved in the B site is 0.3 at% or less. It is more preferable that the amount is 0.25 at% or less.

When the dielectric layer 11, of which the main component is the ceramic material using the ceramic material powder of which the main phase has the perovskite structure, is re-oxidized after firing in the reductive atmosphere, it is possible to further suppress the oxygen defect. When both the A site and the B site include a rare earth element (the rare earth element is substitutionally solid-solved) during the re-oxidizing, the amount of the oxygen defect after the firing is suppressed. It is therefore possible to achieve long lifetime characteristic while IR (Insulation resistance) characteristic is maintained. Thereby, high reliability can be achieved. And so, in the embodiment, the rare earth element is substitutionally solid-solved in both the A site and the B site.

When the amount of the rare earth element that is substitutionally solid-solved in the A site is excessively larger than the amount of the rare earth element that is substitutionally solid-solved in the B site, an amount of a donor doped in the perovskite may be excessively large. In this case, the insulation characteristic may be degraded. On the other hand, when the amount of the rare earth element that is substitutionally solid-solved in the B site is excessively larger than the amount of the rare earth element that is substitutionally solid-solved in the A site, an amount of an acceptor doped in the perovskite may be excessively large. In this case, the amount of the oxygen defect may be increased, and the lifetime characteristic may be degraded. And so, when a ratio of the amount of the rare earth element that is substitutionally solid-solve in the A site and the amount of the rare earth element that is substitutionally solid-solved in the B site is close to 1, the amount of the oxygen defect after the firing is suppressed. And, high reliability having an excellent balance between the insulation characteristic and the lifetime characteristic can be achieved. In concrete, $0.75 \leq$ (the amount of the rare earth element that is substitutionally solid-solved in the A site)/ (the amount of the rare earth element that is substitutionally solid-solved in the B site)$\leq 1.25$. From a viewpoint of suppression of the condition in which the donor is excessively doped, it is preferable that the ratio is 1.20 or less. It is more preferable that the ratio is 1.10 or less. It is still more preferable that the ratio is 1.05 or less. From a view point of suppression of the condition in which the acceptor is excessively doped, it is preferable that the ratio is 0.90 or more. It is more preferable that the ratio is 0.95 or more.

When the total amount of the rare earth element in the A site and the B site is excessively small, it may not be necessarily possible to suppress the amount of the oxygen defect after the firing. And so, it is preferable that the total amount of the rare earth element that is substitutionally solid-solved in the A site and the B site has a lower limit. For example, it is preferable that the total amount of the rare earth element that is substitutionally solid-solved in the A site and the B site is 0.2 at% or more. It is more preferable that the total amount is 0.3 at% or more. The at% means a concentration on a presumption that an amount of a B site element in $ABO_3$ of the ceramic material powder is 100 at%.

On the other hand, when the total amount of the rare earth element in the A site and the B site is excessively large, tetragonal crystallinity of the crystal grains may be degraded. And defect such as reduction of a dielectric constant may occur. And so, it is preferable that the total amount of the rare earth element that is substitutionally solid solved in the A site and the B site has an upper limit. For example, it is preferable that the total amount of the rare earth element that is substitutionally solid-solved in the A site and the B site is 1.0 at % or less. It is more preferable that the total amount is 0.9 at % or less.

As the rare earth element, Y (yttrium), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium) or the like can be used. An ionic radius of the A site is different from that of the B site. It is preferable that an ionic radius of the rare earth element is between the ionic radius of the A site and the ionic radius of the B site, for the purpose of achieving a good balance between the amount of the rare earth element that is substitutionally solid-solved in the A site and the amount of the rare earth element that is substitutionally solid-solved in the B site. For example, from Table 1, it is preferable that La, Ce, Pr, Nd, Pm, Sm, Eu, Gd, Tb, Dy, Ho, Y, Er, Tm, Yb or the like is substitutionally solid-solved, when $BaTiO_3$ is used as the perovskite. An exhibit of Table 1 is "R. D. Shatnnon, Acta Crystallogr., A32,751(1976)".

TABLE 1

| | | IONIC RADIUS (Å) | |
|---|---|---|---|
| | VALENCE | 6-COORDINATED | 12-COORDIMATED |
| Ba | +2 | | 1.610 |
| Ti | +4 | 0.605 | |
| La | +3 | 1.032 | |
| Ce | +3 | 1.010 | |
| Pr | +3 | 0.990 | |
| Nd | +3 | 0.983 | |
| Pm | +3 | 0.970 | |
| Sm | +3 | 0.958 | |
| Eu | +3 | 0.947 | |
| Gd | +3 | 0.938 | |
| Tb | +3 | 0.923 | |
| Dy | +3 | 0.912 | |
| Ho | +3 | 0.901 | |
| Y | +3 | 0.900 | |
| Er | +3 | 0.890 | |
| Tm | +3 | 0.880 | |
| Yb | +3 | 0.868 | |

La, Ce, Pr, Nd, Pm, Sm, Eu, Gd or the like of which the ionic radius is relatively large tends to be substitutionally solid-solved in the A site. On the other hand, Er, Tm, Yb or the like of which the ionic radius is relatively small tends to be substitutionally solid-solved in the B site. And so, when La, Ce, Pr, Nd, Pm, Sm, Eu, Gd or the like is substitutionally solid-solved, it is preferable that Er, Tm, Yb or the like is also substitutionally solid-solved.

The insulation characteristic may be degraded, when the element acting as the donor is substitutionally solid-solved in the B site, and "m" is excessively small in the perovskite ($A_mBO_3$) in which the rare earth element is substitutionally solid-solved in both the A site and the B site. And so, it is preferable that "m" has a lower limit. In concrete, it is preferable that "m" is 1.002 or more. On the other hand, "m" is excessively large, sintering characteristic may be degraded. And so, "m" has an upper limit. In concrete, it is preferable that "m" is 1.010 or less.

It is preferable that an average crystal grain diameter of the main component ceramic of the dielectric layer 11 is 80 nm to 300 nm. It is more preferable that the average crystal grain diameter is 80 nm to 200 nm. When the average crystal grain diameter of the main component ceramic is small, the dielectric constant may be reduced and desirable electrostatic capacity may not be necessarily achieved. On the other hand, when the average crystal grain diameter is large, the lifetime characteristic may be degraded because of reduction of boundary area acting as a barrier against movement of the oxygen defect in a case where the thickness of the dielectric layer 11 is 1.0 μm or less.

When the dielectric layer 11 is thick, high reliability may be achieved. However, in this case, the size of the multilayer ceramic capacitor 100 may be enlarged. Therefore, the embodiment is effective to the multilayer ceramic capacitor 100 having a small size. For example, the embodiment is effective to the multilayer ceramic capacitor 100 of which the dielectric layer 11 has a thickness of 1.0 μm or less. Moreover, when the thickness of the dielectric layer 11 is 0.4 μm or less, the multilayer ceramic capacitor has a smaller size and higher reliability. It is preferable that the thickness of the dielectric layer 11 is 0.2 μm or more, from a viewpoint of securing of the insulation resistance.

Figure 2:
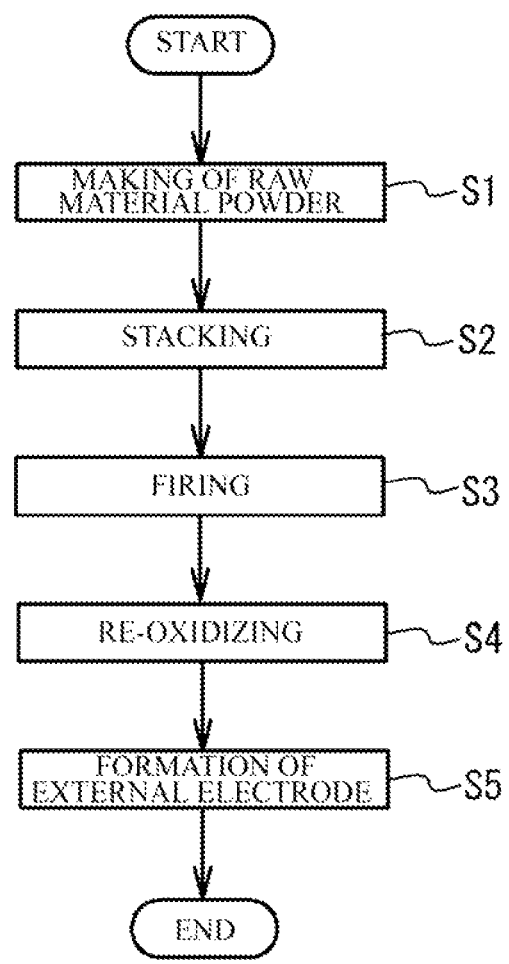
FIG. 2 illustrates a manufacturing method of a multilayer ceramic capacitor.

Next, a description will be given of a manufacturing method of the multilayer ceramic capacitor 100. FIG. 2 illustrates a manufacturing method of the multilayer ceramic capacitor 100.

(Making process of a raw material powder) Ceramic material powder is prepared. A main phase of the ceramic material powder has a perovskite structure expressed by a general formula $ABO_3$. The element acting as the donor is substitutionally solid-solved in the B site. The rare earth element is substitutionally solid-solved in both the A site and the B site. The ceramic material using the ceramic material powder is a main component of the dielectric layers 11. Various methods are known as a synthesizing the ceramic material powder. For example, a solid-phase method, a sol-gel method, a hydrothermal method and so on are known. (the amount of the rare earth element that is substitutionally solid-solved in the A site)/(the amount of the rare earth element that is substitutionally solid-solved in the B site) is 0.75 or more and 1.25 or less. As an example, a description will be given of a solid-phase synthesis method. $TiO_2$ powder and $BaCO_3$ powder are mixed with a dispersing agent and solvent such as pure water. Thus, slurry is obtained. Next, solution in which a rare earth element is solved in acetic acid is neutralized. The resulting solution is mixed with the slurry and kneaded. And the slurry is dispersed in the solution. Alternatively, powder of molybdenum compound may be added to the slurry, and may be subjected to kneading and dispersing with the molybdenum being ionized or complexed. The kneading and the dispersing are performed for 20 hours to 30 hours. Next, the slurry is dried and green material is obtained. The green material is subjected to a first calcination at a temperature of 800 degrees C. to 1150 degrees C. And the ceramic material powder is obtained.

Next, additive compound may be added to the ceramic material powder, in accordance with purposes. The additive compound may be an oxide of Mg (magnesium), Mn (manganese), V (vanadium), Cr (chromium) or an oxide of Co (cobalt), Ni, Li (lithium), B (boron), Na (sodium), K (potassium) and Si (silicon), or glass.

In the embodiment, compound including additive compound is mixed with the ceramic material powder. The resulting ceramic material powder with the additive compound is calcined within a temperature range of 820 degrees C. to 1150 degrees C. Then, the ceramic material powder is wet-blended with the additive compound. After that, the ceramic material powder with the additive compound is dried and crushed. And, desirable ceramic material is prepared. For example, it is preferable that an average grain diameter of the ceramic material is 50 nm to 150 nm from a viewpoint of reducing the thickness of the dielectric layer 11. For example, the grain diameter of the resulting ceramic material may be adjusted by crushing the resulting ceramic material. Alternatively, the grain diameter may be adjusted by performing the crushing and a classifying process. With the processes, the ceramic material acting as the main component of the dielectric layer 11 is obtained.

(Stacking Process) Next, a binder such as polyvinyl butyral (PVB) resin, an organic solvent such as ethanol or toluene, and a plasticizer are added to the resulting ceramic material and wet-blended. With use of the resulting slurry, a strip-shaped dielectric green sheet with a thickness of 3 μm to 10 μm is coated on a base material by, for example, a die coater method or a doctor blade method, and then dried.

Then, a pattern of the internal electrode layer 12 is provided on the surface of the dielectric green sheet by printing a metal conductive paste for forming an internal electrode layer with use of screen printing or gravure printing. The metal conductive paste includes an organic binder. Thus, internal electrode layer patterns that are alternately extracted to the pair of external electrodes are provided. As a co-material, ceramic particles are added to the metal conductive paste. The main component of the ceramic particle is not limited. It is preferable that the main component of the ceramic particle is the same as the main component ceramic of the dielectric layer 11. For example, $BaTiO_3$ of which an average grain diameter is 50 nm or less may be evenly dispersed.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets, which are to be the cover layers 13, are compressed on the stacked dielectric green sheets and under the stacked dielectric green sheets. The resulting multilayer structure is cut into a predetermined size (for example, 1.0 mm×0.5 mm).

The binder is removed from the resulting ceramic multilayer structure in $N_2$ atmosphere. After that, a metal conductive paste which includes metal filler, a co-material, a binder, a solvent and so on and is to be the ground layer of the external electrodes 20a and 20b is coated from the both edge faces to the side faces of the resulting ceramic multilayer structure and is dried.

(Firing process) Next, after removing the binder in $N_2$ atmosphere at 250 degrees C. to 500 degrees C., the resulting compact is fired for ten minutes to 2 hours in a reductive atmosphere, of which an oxygen partial pressure is $10^{-5}$ to $10^{-8}$ atm, in a temperature range of 1100 degrees C. to 1300 degrees C. Thus, each compound structuring the dielectric green sheet is sintered and grains of each compound grow. In this manner, a sintered structure is obtained.

(Re-oxidizing process) After that, a re-oxidizing process may be performed at 600 degrees C. to 1000 degrees C. in N2 gas atmosphere.

(Plating process) After that, metal layers such as Cu, Ni or Su are coated on the ground layers of the external electrodes 20a and 20b by a plating process.

In the manufacturing method of the embodiment, the element acting as the donor is substitutionally solid-solved in the B site of the perovskite structure in the ceramic material powder used in the material powder making process. Therefore, the amount of the oxygen defect in the perovskite structure during the firing is suppressed. And, the lifetime of the dielectric layers 11 is elongated. It is therefore possible to improve the reliability. Moreover, the amount of the oxygen defect after the firing is suppressed, because the rare earth element is substitutionally solid-solved in both the A site and the B site. Therefore, the insulation characteristic is maintained, and the long lifetime characteristic can be achieved. Therefore, high reliability can be achieved. And, when the relationship 0.75≤(the amount of the rare earth element that is substitutionally solid-solved in the A site)/(the amount of the rare earth element that is substitutionally solid-solved in the B site)≤1.25 is achieved, the amount of the oxygen defect after the firing is suppressed. And, high reliability having an excellent balance between the insulation characteristic and the lifetime characteristic can be achieved.

From a viewpoint of suppression of the condition in which the donor is excessively doped, it is preferable that the ratio is 1.20 or less. It is more preferable that the ratio is 1.10 or less. It is still more preferable that the ratio is 1.05 or less. From a view point of suppression of the condition in which the acceptor is excessively doped, it is preferable that the ratio is 0.90 or more. It is more preferable that the ratio is 0.95 or more.

In the B site, when an amount of the element acting as the donor is excessively small, it may not be necessarily possible to sufficiently suppress oxygen defect. And so, it is preferable that an amount of the element that acts as the donor and is substitutionally solid-solved in the B site has a lower limit. For example, it is preferable that the amount of the element that acts as the donor and is substitutionally solid-solved in the B site is 0.05 at% or more, on a presumption that an amount of a main component element of the B site is 100 at%. It is more preferable that the amount is 0.1 at% or more.

On the other hand, when the amount of the element acting as the donor is excessively large in the B site, defect such as decrease of insulation resistance of the multilayer ceramic capacitor 100 may occur. And so, it is preferable that the amount of the element that acts as the donor and is substitutionally solid-solved in the B site has an upper limit. For example, it is preferable that the amount of the element that acts as the donor and is substitutionally solid-solved in the B site is 0.3 at% or less. It is more preferable that the amount is 0.25 at% or less.

When the total amount of the rare earth element in the A site and the B site is excessively small, it may not be necessarily possible to suppress the amount of the oxygen defect after the firing. And so, it is preferable that the total amount of the rare earth element that is substitutionally solid solved in the A site and the B site has a lower limit. For example, it is preferable that the total amount of the rare earth element that is substitutionally solid-solved in the A site and the B site is 0.2 at% or more. It is more preferable that the total amount is 0.3 at% or more. The at% means a concentration on a presumption that an amount of a B site element in $ABO_3$ of the ceramic material powder is 100 at%.

On the other hand, when the total amount of the rare earth element in the A site and the B site is excessively large, tetragonal crystallinity of the crystal grains may be degraded. And defect such as reduction of a dielectric constant may occur. And so, it is preferable that the total amount of the rare earth element that is substitutionally solid solved in the A site and the B site has an upper limit. For example, it is preferable that the total amount of the rare earth element that is substitutionally solid-solved in the A site and the B site is 1.0 at% or less. It is more preferable that the total amount is 0.9 at% or less.

As the rare earth element, Y, La, Ce, Pr, Nd, Pm, Sm, Eu, Gd, Tb, Dy, Ho, Er, Tm, Yb or the like can be used. An ionic radius of the A site is different from that of the B site. It is preferable that an ionic radius of the rare earth element is between the ionic radius of the A site and the ionic radius of the B site, from a viewpoint of achieving an excellent balance of substitutional solid-solving of the rare earth element between the A site and the B site. For example, from Table 1, it is preferable that La, Ce, Pr, Nd, Pm, Sm, Eu, Gd, Tb, Dy, Ho, Y, Er, Tm, Yb or the like is substitutionally solid-solved, when $BaTiO_3$ is used as the perovskite.

La, Ce, Pr, Nd, Pm, Sm, Eu, Gd or the like of which the ionic radius is relatively large tends to be substitutionally solid-solved in the A site. On the other hand, Er, Tm, Yb or the like of which the ionic radius is relatively small tends to be substitutionally solid-solved in the B site. And so, when La, Ce, Pr, Nd, Pm, Sm, Eu, Gd or the like is substitutionally solid solved, it is preferable that Er, Tm, Yb or the like is also substitutionally solid-solved.

The insulation characteristic may be degraded, when the element acting as the donor is substitutionally solid-solved in the B site, and "m" is excessively small in the perovskite ($A_mBO_3$) in which the rare earth element is substitutionally solid-solved in both the A site and the B site. And so, it is preferable that "m" has a lower limit. In concrete, it is preferable that "m" is 1.002 or more. On the other hand, when "m" is excessively large, sintering characteristic may be degraded. And so, "m" has an upper limit. In concrete, it is preferable that "m" is 1.010 or less.

EXAMPLES

The multilayer ceramic capacitors in accordance with the embodiment were made and the property was measured.

The ceramic material powder of $BaTiO_3$ in which the element acting as the donor is substitutionally solid-solved in the B site and the rare earth element is substitutionally solid-solved in both the A site and the B site was prepared. The average grain diameter was 150 nm. In any one of examples 1 to 11 and comparative examples 1 to 9, 0.2 at% of Mo was substitutionally solid-solved in the B site on a presumption that the amount of Ti was 100 at%.

In the examples 1 and 2, the ceramic material powder in which 0.2 at% of Ho was substitutionally solid-solved as the rare earth element was used. After that, $Ho_2O_3$ of which an amount corresponded to 0.8 at% of Ho was added. In the examples 3 to 7, the ceramic material powder in which 0.5 at% of Ho was substitutionally solid-solved as the rare earth element was used. After that, $Ho_2O_3$ of which an amount corresponded to 0.5 at% of Ho was added. In the example 8, the ceramic material powder in which 0.25 at% of Gd and 0.25 at% of Yb were substitutionally solid-solved as the rare earth element was used. After that, $Gd_2O_3$ of which an amount corresponded to 0.25 at% of Gd and $Yb_2O_3$ of which an amount corresponded to 0.25 at% of Yb were added. In the examples 9 to 11, the ceramic material powder in which 1.0 at% of Ho was substitutionally solid-solved as the rare earth element was used. In the comparative example 1, the rare earth element was not substitutionally solid-solved in the ceramic material powder. $Ho_2O_3$ of which an amount corresponded to 1.0 at% of Ho was added. In the comparative example 2, the ceramic material powder in which 0.2 at% of Ho was substitutionally solid-solved as the rare earth element was used. After that, $Ho_2O_3$ of which an amount corresponded to 0.8 at% of Ho was added. In the comparative examples 3 to 5, the ceramic material powder in which 0.5 at% of Ho was substitutionally solid-solved as the rare earth element was used. After that, $Ho_2O_3$ of which an amount corresponded to 0.5 at% of Ho was added. In the comparative example 6, the ceramic material powder in which 0.2 at% of Gd and 0.3 at% of Yb were substitutionally solid-solved as the rare earth element was used. After that, $Gd_2O_3$ of which an amount corresponded to 0.2 at% of Gd and $Yb_2O_3$ of which an amount corresponding to 0.3 at% of Yb were added. In the comparative example 7, the ceramic material powder in which 0.3 at% of Gd and 0.2 at% of Yb were substitutionally solid-solved as the rare earth element was used. After that, $Gd_2O_3$ of which an amount corresponded to 0.3 at% of Gd and $Yb_2O_3$ of which an amount corresponded to 0.2 at% of Yb were added. In the comparative examples 8 and 9, the ceramic material powder in which 1.0 at% of Ho was substitutionally solid-solved as the rare earth element was used. In this paragraph, "at%" means a concentration on a presumption that an amount of B site of $ABO_3$ of the ceramic material powder is 100 at%.

In the example 1, (the amount of the rare earth element that was substitutionally solid-solved in the A site)/(the amount of the rare earth element that was substitutionally solid-solved in the B site) was 0.95. In the example 2, (the amount of the rare earth element that was substitutionally solid-solved in the A site)/(the amount of the rare earth element that was substitutionally solid-solved in the B site) was 1.10. In the example 3, (the amount of the rare earth element that was substitutionally solid-solved in the A site)/(the amount of the rare earth element that was substitutionally solid-solved in the B site) was 0.75. In the example 4, (the amount of the rare earth element that was substitutionally solid-solved in the A site)/(the amount of the rare earth element that was substitutionally solid-solved in the B site) was 0.95. In the example 5, (the amount of the rare earth element that was substitutionally solid-solved in the A site)/(the amount of the rare earth element that was substitutionally solid-solved in the B site) was 1.00. In the example 6, (the amount of the rare earth element that was substitutionally solid-solved in the A site)/(the amount of the rare earth element that was substitutionally solid-solved in the B site) was 1.05. In the example 7, (the amount of the rare earth element that was substitutionally solid-solved in the A site)/(the amount of the rare earth element that was substitutionally solid-solved in the B site) was 1.25. In the example 8, (the amount of the rare earth element that was substitutionally solid-solved in the A site)/(the amount of the rare earth element that was substitutionally solid-solved in the B site) was 1.10. In the example 9, (the amount of the rare earth element that was substitutionally solid-solved in the A site)/(the amount of the rare earth element that was substitutionally solid-solved in the B site) was 0.75. In the example 10, (the amount of the rare earth element that was substitutionally solid-solved in the A site)/(the amount of the rare earth element that was substitutionally solid-solved in the B site) was 1.03. In the example 11, (the amount of the rare earth element that was substitutionally solid-solved in the A site)/(the amount of the rare earth element that was substitutionally solid-solved in the B site) was 1.20. In the comparative example 2, (the amount of the rare earth element that was substitutionally solid-solved in the A site)/(the amount of the rare earth element that was substitutionally solid-solved in the B site) was 1.32. In the comparative example 3, (the amount of the rare earth element that was substitutionally solid-solved in the A site)/(the amount of the rare earth element that was substitutionally solid-solved in the B site) was 0.50. In the comparative example 4, (the amount of the rare earth element that was substitutionally solid-solved in the A site)/(the amount of the rare earth element that was substitutionally solid-solved in the B site) was 1.35. In the comparative example 5, (the amount of the rare earth element that was substitutionally solid-solved in the A site)/(the amount of the rare earth element that was substitutionally solid-solved in the B site) was 1.50. In the comparative example 6, (the amount of the rare earth element that was substitutionally solid-solved in the A site)/(the amount of the rare earth element that was substitutionally solid-solved in the B site) was 0.70. In the comparative example 7, (the amount of the rare earth element that was substitutionally solid-solved in the A site)/(the amount of the rare earth element that was substitutionally solid-solved in the B site) was 1.50. In the comparative example 8, (the amount of the rare earth element that was substitutionally solid-solved in the A site)/(the amount of the rare earth element that was substitutionally solid-solved in the B site) was 0.66. In the comparative example 9, (the amount of the rare earth element that was substitutionally solid-solved in the A site)/(the amount of the rare earth element earth element that was substitutionally solid-solved in the B site) was 1.30.

As the amount of an element which was substitutional solid-solved, Processed samples were obtained by performing an etching process to the ceramic material powder with use of Ar ion and deforming the ceramic material powder into a hemisphere shape. The processed samples were measured by an energy dispersion type fluorescence X-ray spectrometry (EDS) with use of a TEM (Transmission Electron Microscope). Thus, the amount of an element which was substitutionally solid-solved was measured. With respect to (the amount of the rare earth element that was substitutionally solid-solved in the A site)/(the amount of the rare earth element that was substitutionally solid-solved in the B site), the processed samples were measured with use of (High Angle Annular Dark Field Scanning Transmission Electron Microscope).

In any one of the examples 1 to 11 and the comparative examples 1 to 9, Mo was substitutionally solid-solved in the B site, the rare earth element was substitutionally solid-solved in both the A site and the B site, and "m" in $A_mBO_3$ was 1.002.

As an additive agent, 1.0 mol % of MgO was added to the ceramic material powder. As additive agents, 0.05 mol % of MnO and 0.05 mol % of V205 were added to the ceramic material powder. As sintering assistants, 1.0 mol % of $SiO_2$ and 1.0 mol % of $BaCO_3$ were added to the ceramic material powder. "mol %" in this case is a value on a presumption that an amount of $ABO_3$ in the ceramic material powder is 100 mol %.

The additive agent and the sintering assistant were added to the ceramic material powder. The resulting ceramic material powder was sufficiently wet-blended and crushed with a ball mil. Thus, the ceramic material was obtained. An organic binder and a solvent were added to the ceramic material. And dielectric green sheets were made by a doctor blade method. A thickness of the dielectric green sheet was 0.8 μm. The organic binder was polyvinyl butyral (PVB) resin or the like. The solvent was ethanol, toluene or the like. And a plasticizer and so on were added. Next, the conductive paste for forming the internal electrode layer was formed by a planetary boll mill. The conductive paste included a main component metal (Ni) powder of the internal electrode layer 12, a co-material (barium titanate), a binder (ethyl cellulose), a solvent and an auxiliary as needed.

The conductive paste for forming the internal electrode layer was screen-printed on the dielectric green sheet. 250 of the dielectric green sheets on which the conductive paste for forming the internal electrode layer was printed were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size. The binder was removed from the ceramic multilayer structure in $N_2$ atmosphere. After that, the metal paste including the metal filler of which a main component was Ni, the co-material, the binder and the solvent was coated from the both edge faces to the side faces of the ceramic multilayer structure and was dried. After that, the resulting multilayer structure was fired together with the metal paste for 10 minutes to 2 hours in a reductive atmosphere in a temperature range of 1100 degrees C. to 1300 degrees C. And, a sintered structure was formed.

The resulting sintered structure had a length of 0.6 mm, a width of 0.3 mm and a height of 0.3 mm. The sintered structure was subjected to a re-oxidation process at 800 degrees C. in $N_2$ atmosphere. After that, by a plating process, a Cu-plated layer, a Ni-plated layer and a Sn-plated layer were formed on a surface of the ground layer of the external electrodes 20a and 20b. And, the multilayer ceramic capacitor 100 was obtained.

(Analysis) 20 samples were made with respect to each of the examples 1 to 11 and the comparative examples 1 to 9. Each sample was subjected to the lifetime characteristic test. And an average lifetime was measured with respect to each of the examples 1 to 11 and the comparative examples 1 to 9. In the lifetime characteristic test, a direct current voltage of 10V was applied to each sample at 125 degrees C. A leak current was measured by a current meter. And a time until each sample was broken was a lifetime value. Each sample was subjected to an insulation resistance test. And an average insulation resistance was measured with respect to each of the examples 1 to 11 and the comparative examples 1 to 9. In the insulation resistance test, a direct current voltage of 10V was applied to each sample at a room temperature. And the insulation resistance was measured from a current value after 60 seconds.

When the average lifetime was 100 min or less, the lifetime characteristic was determined as NG. When the insulation resistance was 10 MΩ or less, the insulation characteristic was determined as NG. When at least one of the lifetime characteristic and the insulation characteristic was determined as NG, reliability was determined as NG. Table 2 shows the results.

TABLE 2

|  | AMOUNT OF RARE EARTH ELEMENT (at %) | RATIO OF RARE EARTH ELEMENT (A SITE/B SITE) | LIFETIME (min) | INSULATION RESISTANCE (MΩ) | RELIABILITY |
|---|---|---|---|---|---|
| EXAMPLE 1 | Ho: 0.2 | 0.95 | 176 | 19 | ○ |
| EXAMPLE 2 | Ho: 0.2 | 1.10 | 188 | 20 | ○ |
| EXAMPLE 3 | Ho: 0.5 | 0.75 | 108 | 18 | ○ |
| EXAMPLE 4 | Ho: 0.5 | 0.95 | 222 | 26 | ○ |

TABLE 2-continued

| | AMOUNT OF RARE EARTH ELEMENT (at %) | RATIO OF RARE EARTH ELEMENT (A SITE/B SITE) | LIFETIME (min) | INSULATION RESISTANCE (MΩ) | RELIABILITY |
|---|---|---|---|---|---|
| EXAMPLE 5 | Ho: 0.5 | 1.00 | 501 | 29 | ○ |
| EXAMPLE 6 | Ho: 0.5 | 1.05 | 242 | 25 | ○ |
| EXAMPLE 7 | Ho: 0.5 | 1.25 | 185 | 16 | ○ |
| EXAMPLE 8 | Gd: 0.25 + Yb: 0.25 | 1.10 | 333 | 14 | ○ |
| EXAMPLE 9 | Ho: 1.0 | 0.75 | 234 | 22 | ○ |
| EXAMPLE 10 | Ho: 1.0 | 1.03 | 715 | 19 | ○ |
| EXAMPLE 11 | Ho: 1.0 | 1.20 | 621 | 17 | ○ |
| COMPARATIVE EXAMPLE 1 | NOT ADDED | — | 67 | 7.7 | x |
| COMPARATIVE EXAMPLE 2 | Ho: 0.2 | 1.32 | 181 | 8.5 | x |
| COMPARATIVE EXAMPLE 3 | Ho: 0.5 | 0.50 | 55 | 28 | x |
| COMPARATIVE EXAMPLE 4 | Ho: 0.5 | 1.35 | 195 | 8.1 | x |
| COMPARATIVE EXAMPLE 5 | Ho: 0.5 | 1.50 | 155 | 6.2 | x |
| COMPARATIVE EXAMPLE 6 | Gd: 0.2 + Yb: 0.3 | 0.70 | 41 | 19 | x |
| COMPARATIVE EXAMPLE 7 | Gd: 0.3 + Yb: 0.2 | 1.50 | 298 | 4.2 | x |
| COMPARATIVE EXAMPLE 8 | Ho: 1.0 | 0.66 | 93 | 24 | x |
| COMPARATIVE EXAMPLE 9 | Ho: 1.0 | 1.30 | 539 | 3.6 | x |

In the comparative example 1, both the lifetime characteristic and the insulation characteristic were determined as NG. It is thought that this was because the ceramic material powder in which the rare earth element was not substitutionally solid-soled was used, and the rare earth element was not sufficiently substitutionally solid-solved. In the comparative examples 2, 4, 5, 7 and 9, the lifetime characteristic was determined as OK, but the insulation characteristic was determined as NG. It is thought that this was because (the amount of the rare earth element that was substitutionally solid-solved in the A site)/(the amount of the rare earth that was substitutionally solid-solved in the B site) was more than 1.25. In the comparative examples 3, 6 and 8, the insulation characteristic was determined as OK, but the lifetime characteristic was determined as NG. It is thought that this was because (the amount of the rare earth element that was substitutionally solid-solved in the A site)/(the amount of the rare earth element that was substitutionally solid-solved in the B site) was less than 0.75.

On the other hand, in any one of the examples 1 to 11, both the lifetime characteristic and the insulation characteristic were determined as OK. It is thought that this was because the element acting as the donor was substitutionally solid-solved in the B site, the rare earth element was substitutionally solid-solved in both the A site and the B site, and (the amount of the rare earth element that was substitutionally solid-solved in the A site)/(the amount of the rare earth element that was substitutionally solid-solved in the B site) was 0.75 or more and 1.25 or less.

The insulation resistance and the lifetime characteristic of the examples 4 and 5 were better than those of the example 3. It is thought that this was because (the amount of the rare earth element that was substitutionally solid-solved in the A site)/(the amount of the rare earth element that was substitutionally solid-solved in the B site) was 0.95 or more. The insulation resistance and the lifetime characteristic of the example 2 were better than those of the example 7. It is thought that this was because (the amount of the rare earth element that was substitutionally solid-solved in the A site)/(the amount of the rare earth element that was substitutionally solid-solved in the B site) 1.10 or less. The insulation resistance and the lifetime characteristic of the examples 5 and 6 were better than those of the example 2. It is thought that this was because (the amount of the rare earth element that was substitutionally solid-solved in the A site)/(the amount of the rare earth element that was substitutionally solid-solved in the B site) was 1.05 or less. The lifetime characteristic of the example 10 was better than that of the example 9. It is thought that this was because (the amount of the rare earth element that was substitutionally solid-solved in the A site)/(the amount of the rare earth element that was substitutionally solid-solved in the B site) was 0.95 or more. The lifetime characteristic of the example 10 was better than that of the example 11. It is thought that this was because (the amount of the rare earth element that was substitutionally solid-solved in the A site)/(the amount of the rare earth element that was substitutionally solid-solved in the B site) was 1.05 or less.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer structure in which each of a plurality of dielectric layers and each of internal electrode layers are alternately stacked;
   wherein a main component of the dielectric layers is a ceramic material,
   wherein a main phase of the ceramic material has a perovskite structure expressed by a general formula $ABO_3$, said perovskite structure being selected from the group consisting of $BaTiO_3$, $CaZrO_3$, $CaTiO_3$, $SrTiO_3$, and $Ba_{1-x-y}Ca_xSr_yTi_{1-z}Zr_zO_3$ ($0 \leq y \leq 1$, $x=0$, $z=0$),
   wherein a B site of the ceramic material includes an element acting as a donor, wherein a rare earth element is solid-solved in each of A site and B site, wherein (an amount of the rare earth element substitutionally solid-solved in the A site)/(an amount of the rare earth element substitutionally solid-solved in the B site) is 0.75 or more and 1.25 or less, wherein the amount of the element that acts as the donor and is substitutionally solid-solved in the B site is 0.05 at% or more and 0.3 at% or less when an amount of a main component element of the B site is 100 at%.

2. Ceramic material powder comprising:

a main phase having a perovskite structure expressed by a general formula $ABO_3$, said perovskite structure being selected from the group consisting of $BaTiO_3$, $CaZrO_3$, $CaTiO_3$, $SrTiO_3$, and $Ba_{1-x-y}Ca_xSr_yTi_{1-z}Zr_2O_3$ (0≤x≤1, 0≤y≤1, z=0);

an element acting as a donor, in a B site of the perovskite structure; and a rare earth element solid-solved in an A site and the B site of the perovskite structure, wherein (an amount of the rare earth element substitutionally solid-solved in the A site)/(an amount of the rare earth element substitutionally solid-solved in the B site) is 0.75 or more and 1.25 or less, wherein the amount of the element that acts as the donor and is substitutionally solid-solved in the B site is 0.05 at% or more and 0.3 at% or less when an amount of a main component element of the B site is 100 at%.

* * * * *